July 2, 1929.　　　　J. H. BUTLER　　　　1,719,587
MOTOR VEHICLE BODY
Filed Aug. 27, 1925　　　2 Sheets-Sheet 1
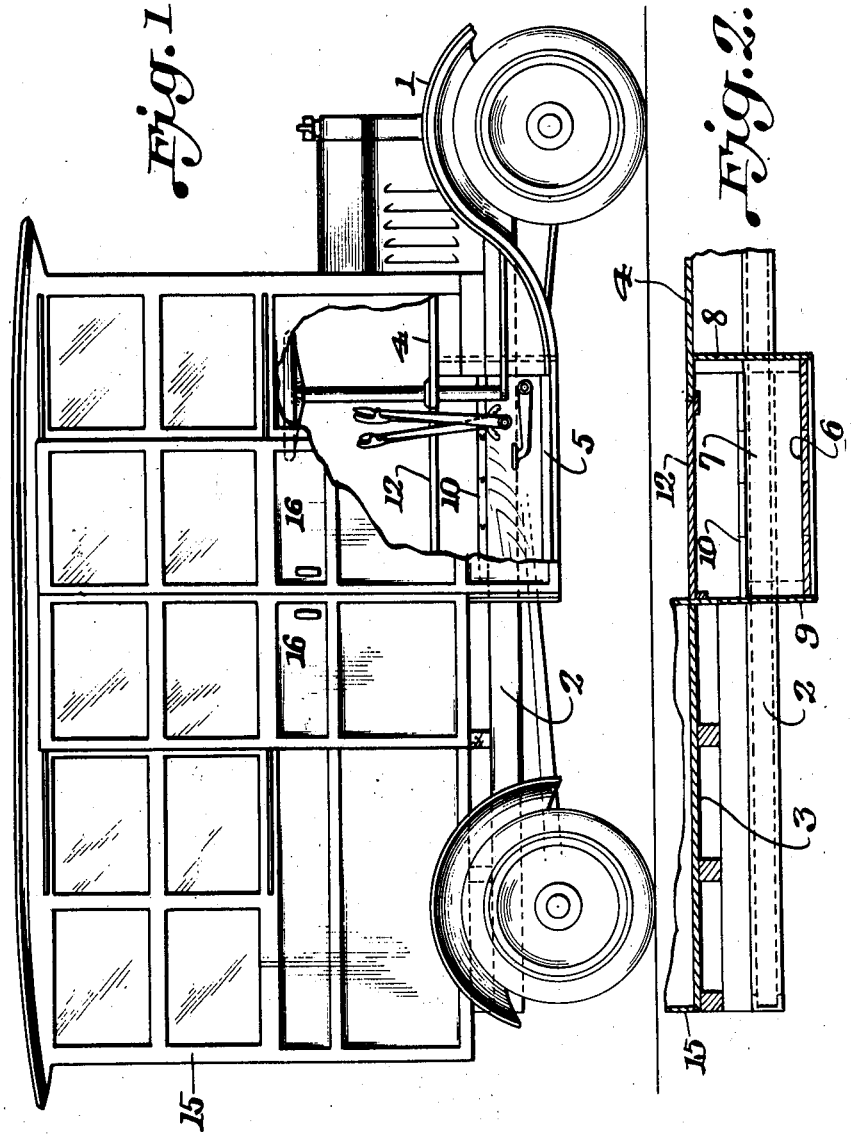
Jay H. Butler
Inventor
By C. A. Snow & Co.
Attorneys

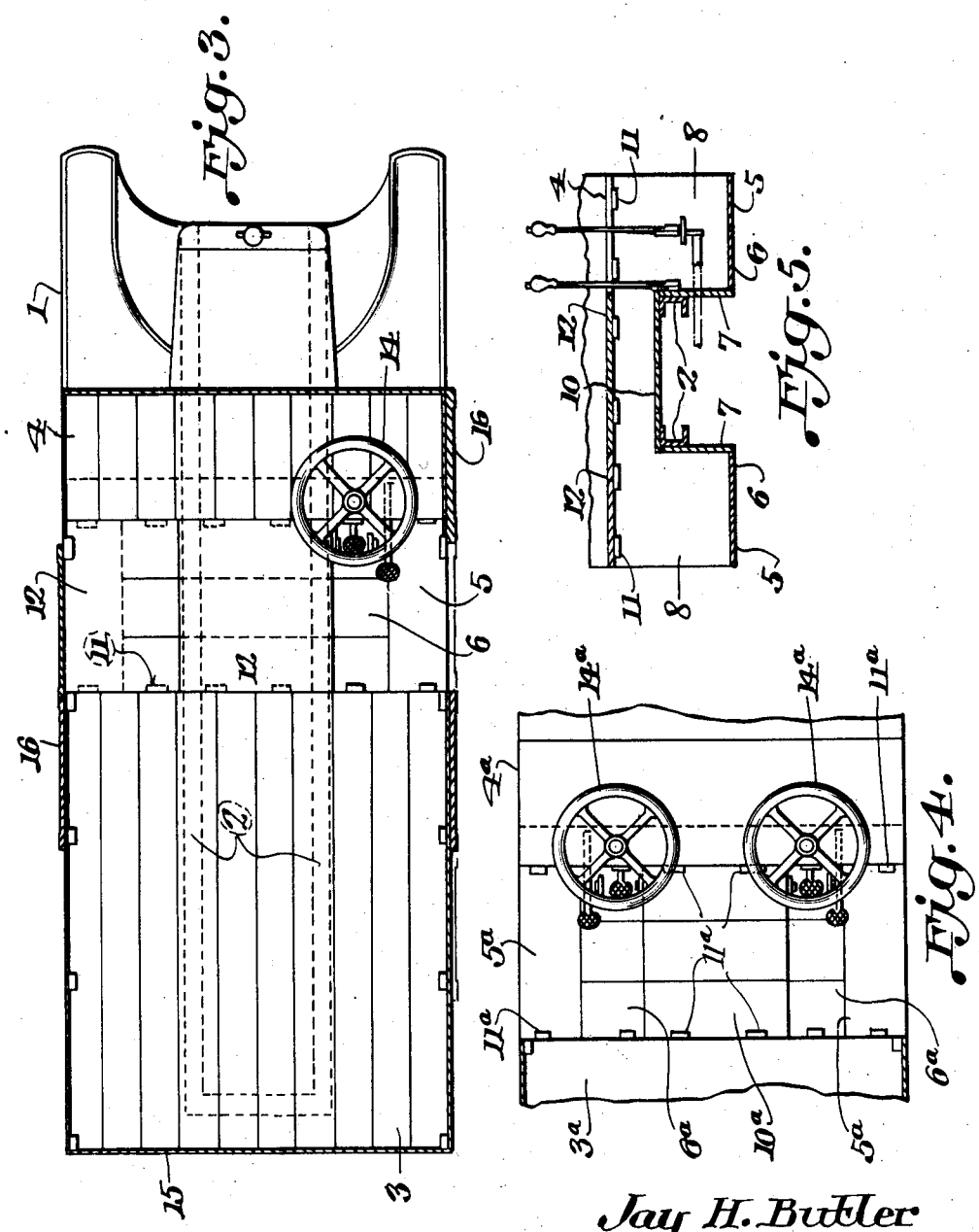

Patented July 2, 1929.

1,719,587

UNITED STATES PATENT OFFICE.

JAY H. BUTLER, OF NEWARK, OHIO.

MOTOR-VEHICLE BODY.

Application filed August 27, 1925. Serial No. 52,902.

This invention aims to provide a motor vehicle body which will provide maximum platform space and still permit an operator to stand upright at one side of the vehicle, for the purpose of controlling the vehicle, the construction being such that the operator may cross readily from one side of the vehicle to the other, and it being possible for an assistant to stand at that side of the vehicle which is opposite from the side where the operator stands.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention, parts being broken away; Figure 2 is a fragmental longitudinal section; Figure 3 is a horizontal section, the view being, in substance, a top plan; Figure 4 is a plan showing a modification; Figure 5 is a transverse section wherein parts are broken away.

The numeral 1 marks a vehicle of any desired kind whatsoever, the vehicle comprising a frame 2 whereon a rear platform 3 is supported, a front platform 4 being supported on the frame 2 and being disposed at the same height as the rear platform 3. The longitudinal foot boards of the vehicle are marked by the numeral 5. The space between the foot boards 5 and the frame 2 is bridged by extension pieces 6, prolonged inwardly to vertical risers 7 disposed closely adjacent to the frame 2. The numeral 8 marks a forward cross member which is vertically disposed, the cross member extending inwardly to the frame 2 and across the top of the frame, below the front platform 4. The numeral 9 designates a vertical cross member, which may be denominated a rear cross member, the rear cross member 9 extending inwardly to the frame 2 and across the top of the frame at the forward end of the rear platform 3, the parts 8, 7, 9 and 6 preferably being connected together.

The parts 8, 9, 6 and 5 define a transverse well between the platform 4 and the platform 3, the bottom of the well, represented by the parts 5 and 6, being lower than either of the platforms 4 or 3. An intermediate or supplemental platform 10 is supported on the frame 2, in the transverse well above defined, and is located intermediate the ends of the well, the supplemental platform preferably being disposed at a lower elevation than either of the platforms 4 and 3, so that the operator can step readily from one side of the vehicle to the other, the supplemental platform 10 being located at a higher elevation than the bottom 5—6 of the well.

In either end of the well, and above the platform 10, covers 12 are removably mounted. The covers 12 may be supported on cleats 11, although any desired means for supporting the false covers may be supplied. The covers 12 are located on a level with the platforms 3 and 4. The controlling mechanism is marked by the numeral 14 and is so disposed that a person may manipulate it, whilst the person is standing upright in one end of the well, the cover 12 at that end of the well being removed, the cover at the other end of the well being permitted to remain in place in order to provide additional room for merchandise. If, however, the operator is to stand at one side of the vehicle, and an assistant is to stand at the other side of the vehicle, then neither end of the well is supplied with a cover. The intermediate cover, which is above the platform 10, will remain in place when extra floor space is desired, and be removed if the operator wishes to cross quickly from one side of the vehicle to the other, through the well.

The body 15 of the vehicle may be constructed as desired, and the showing of the drawings as to the body 15 is not to be taken to indicate that the body must be made as the drawings disclose. The side portions of the body may carry slidably mounted doors 16, enabling the operator to step into the ends of the well and there may be as many other doors or windows on the body as is found expedient, the doors and windows being located wherever desired.

In Figure 4, parts hereinbefore described have been designated by numerals previously used, with the suffix "a". Figure 4 shows that a double control 14ᵃ may be provided if desired, so that the operator can step into the well from either end thereof, and steer and drive the vehicle, and the control may be located at either end of the well, thereby providing for a left-hand drive or a right-hand drive.

What is claimed is:—

A vehicle for delivering merchandise, the vehicle comprising main platforms, a transverse well between the platforms, the bottom of the well being made up of an approximately horizontal supplemental platform extended in a single length across the well from the front of the vehicle toward the back of the vehicle and located in spaced relation to the sides of the vehicle, and approximately horizontal foot boards located on opposite sides of the supplemental platform at the outer sides of the vehicle, the supplemental platform being located at a lower level than the main platforms, so that an operator may step through the well from one side of the vehicle to the other, and the foot boards being located at a lower level than the supplemental platform, a freely removable cover, and means for mounting the cover in either end of the well, above one of the foot boards, thereby affording an increased supporting area for the merchandise to be delivered, and leaving the other foot board free so that the operator can stand on it, control the vehicle, and dispense the merchandise.

In testimony that I claim the foregoing as my own, I have hereto affixed my signature.

JAY H. BUTLER.